UNITED STATES PATENT OFFICE.

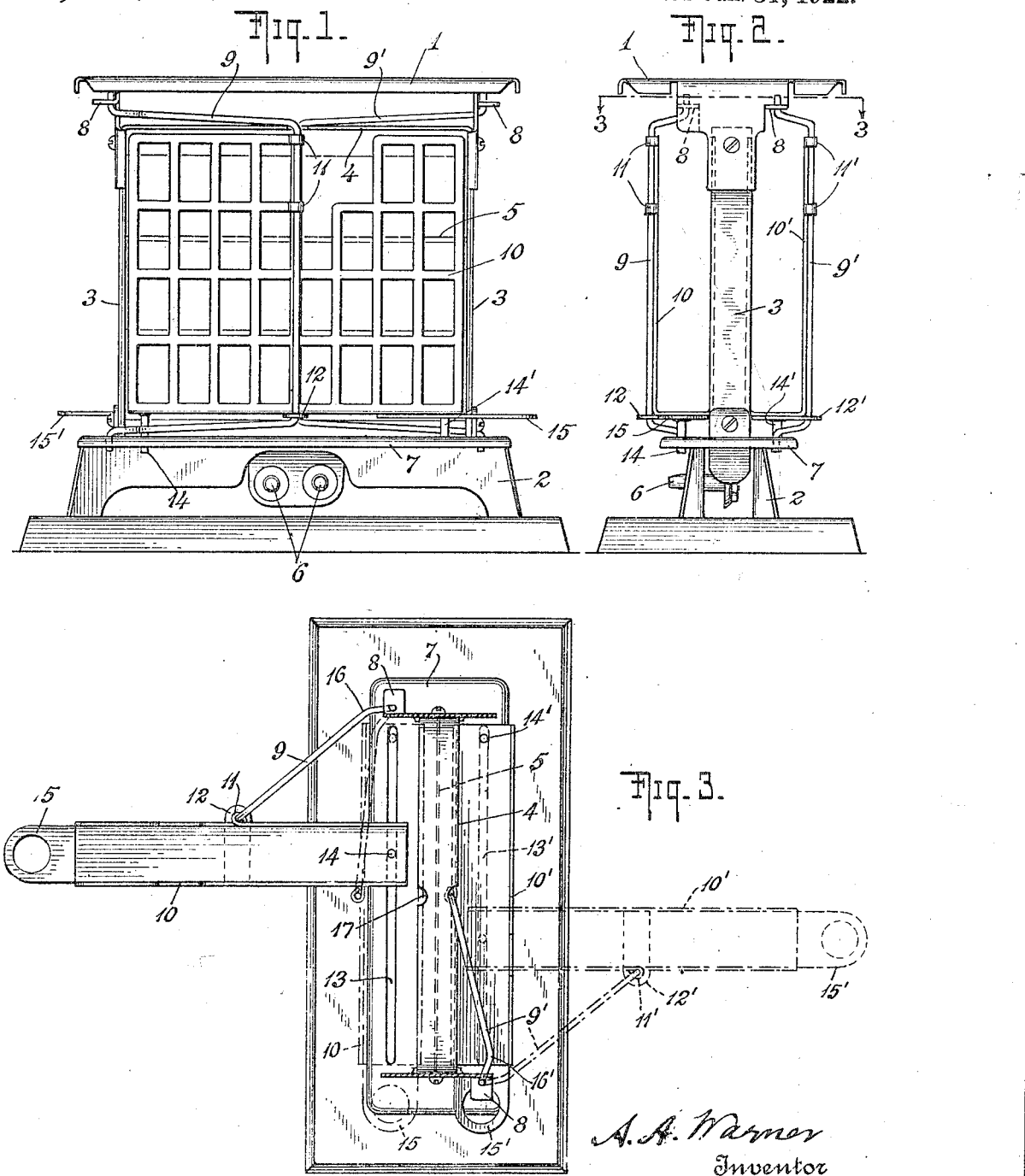

ALONZO A. WARNER, OF NEW BRITAIN, CONNECTICUT, ASSIGNOR TO LANDERS, FRARY & CLARK, OF NEW BRITAIN, CONNECTICUT, A CORPORATION OF CONNECTICUT.

TOASTER.

1,404,916.   Specification of Letters Patent.   Patented Jan. 31, 1922.

Application filed February 9, 1921. Serial No. 443,521.

*To all whom it may concern:*

Be it known that I, ALONZO A. WARNER, a citizen of the United States, residing at New Britain, county of Hartford, State of Connecticut, have invented a certain new and useful Improvement in Toasters, of which the following is a full, clear, and exact description.

My invention relates to toasters and has for its object to produce a toaster having a reversible toast holder which shall be simple and inexpensive to manufacture and easy to operate.

The following is a description of a toaster embodying my invention, reference being had to the accompanying drawing, in which—

Figure 1 is a front elevation of a toaster embodying my invention;

Figure 2 is an end elevation of the same; and

Figure 3 is a sectional plan view on the line 3, 3 of Fig. 2 showing one of the holders in extended position.

Referring more particularly to the drawing, 1 is the frame of a toaster, the same comprising a base 2 and side uprights 3 connected by a cross-bar 4 and housing within it the ordinary heating element indicated at 5 to which are connected the circuit terminals 6 adapted to receive the ordinary plug. 7 is a supporting plate to which the side members 3 are secured. Each side member is provided with a perforated ear 8 adjacent its upper end. Movably mounted in the perforation in an ear 8 and an aligning perforation in the supporting frame 7 are the bent ends of a U-shaped carrier 9 formed of wire and whose closed end is pivotally connected to a toast holder 10 having two sides and a bottom so as to be U-shaped, the connection between the toast holder and the carrier 9 consisting of loops 11 and perforated ear 12 carried by the holder. The supporting plate is provided with a slot 13 lying in a plane parallel to the plane of the heating element and extending from side to side of the frame. The toast holder is provided at one end with a pin 14 which extends into the slot. At the other end the toast holder is provided with a handle 15 for actuating the same. When the toast holder is in toasting position it is parallel to the heating element and closely adjacent thereto as shown in dots at the left hand side of Fig. 3. After toasting it is moved to the position shown in full lines on the left hand side of Fig. 3, this movement being brought about by manipulating the handle 15. During this movement the pin 14 moves toward the center of the slot 13 and to a point slightly short of the center when the toast holder is at right angles to the plane of the heating element. The further movement of the handle 15 results in the pin 14 traveling toward the other end of the slot 13 until it is near the end of the slot. A reverse movement of the handle restores the holder to its original position. When the pin 14 is adjacent the corresponding ear 8 the carrier 9 lies on the outside surface of the toast holder as shown in Fig. 1 and as shown in dots on the left of Fig. 3. When the pin is at the other end of the slot however, the closed end of the carrier is adjacent to the inner face of the holder as shown at 14' in full lines at the right hand side of Fig. 3.

In order that the arms of the carrier shall not collide with the pin 14 in either position it is bent slightly at the point 16, Fig. 3 and furthermore the upper member 4 of the frame has notches 17 cut therein into which the carrier enters when on the inside of the toast holder.

It is to be noted that the arms of the carrier are pivoted to the frame at points adjacent one end of the heating element and in a plane lying in front thereof and paralled thereto and is pivoted to said holder at a point adjacent its central portion and that the slot 13 in which the pin 14 travels is cut by the vertical plane which is parallel to the heating element and contains the pivotal mountings of the carrier in the frame. The other side of the toaster is provided with a similar carrier 9', holder 10', slot 13' and pin 14' co-acting in the manner described.

As will be evident to those skilled in the art, my invention permits of various modifications without departing from the spirit thereof or the scope of the appended claims.

What I claim is:

1. In a toaster, the combination of a frame, a heating element therein, a toast holder, a holder carrier comprising arms pivoted to said frame at points adjacent one end of said element and in a plane lying in front thereof and parallel thereto, and also pivoted to said holder adjacent its central portion, a projection on one end of said holder and a guide carried by said frame along which said projection moves, said guide being parallel to said element.

2. In a toaster, the combination of a frame, a heating element therein, a toast holder, a holder carrier comprising arms pivoted to said frame at points adjacent one end of said element and in a plane lying in front thereof and parallel thereto, and also pivoted to said holder adjacent its central portion, a projection on one end of said holder and a slot in said frame in which said projection moves, said slot being parallel to said element.

3. In a toaster, the combination of a frame, a heating element therein, a toast holder, a holder carrier comprising arms pivoted to said frame at points adjacent one end of said element and in a plane lying in front thereof and parallel thereto, and also pivoted to said holder adjacent its central portion, a projection on one end of said holder and a slot in said frame in which said projection moves, said slot being parallel to said element, said plane passing substantially through the longitudinal axis of said holder when said holder is parallel to said element and through the longitudinal center of said slot.

4. In a toaster, the combination of a frame, a heating element therein, a toast holder, a holder carrier comprising arms pivoted to said frame at points adjacent one end of said element and in a plane lying in front thereof and parallel thereto, and also pivoted to said holder adjacent its central portion, a projection on one end of said holder and a slot in said frame in which said projection moves, said slot being parallel to said element, said plane passing substantially through the longitudinal axis of said holder when said holder is parallel to said element and through the longitudinal center of said slot, said pivotal connection of said carrier to said holder being out of said plane when said holder is parallel to said element.

ALONZO A. WARNER.